3,825,510
METHOD FOR CROSS-LINKING COPOLYMERS OF TETRAFLUOROETHYLENE AND PROPYLENE
Takashi Yamamoto and Katsuo Uchijima, Yokohama, Japan, assignors to Asahi Glass Company, Ltd., Tokyo, Japan
No Drawing. Filed Dec. 13, 1971, Ser. No. 207,613
Claims priority, application Japan, Dec. 30, 1970, 46/122,837
Int. Cl. C08f 27/00
U.S. Cl. 260—87.5 B
12 Claims

ABSTRACT OF THE DISCLOSURE

A cross-linked copolymer of tetrafluoroethylene and propylene is produced by heating a copolymer of tetrafluoroethylene and propylene in the presence of an organic di-peroxy compound as cross-linking agent.

BACKGROUND OF THE INVENTION

Field of the Invention

This invention relates to a method for cross-linking a copolymer of tetrafluoroethylene and propylene. More particularly, this invention relates to a method for cross-linking a copolymer of tetrafluoroethylene and propylene by using a specific peroxy compound.

Description of the Prior Art

It has been known that the copolymers of tetrafluoroethylene and propylene are cross-linkable fluorine-containing elastomers, and can be cross-linked by heating in the presence of a cross-linking agent, or curing agent, such as an organic peroxy compound or an amine. (See, for instance, U.S. Pat. No. 3,467,635.) It has been difficult, however, to obtain a cross-linked copolymer having sufficiently high mechanical strength for many purposes by such conventional cross-linking methods, and even if a reinforcing filler, such as rubber, is incorporated into the resulting copolymer, sufficiently high mechanical strength has not been attainable.

Moreover, in general, it has been quite difficult to obtain satisfactory cross-linking of this copolymer, especially if the copolymer is simply a binary copolymer of only tetrafluoroethylene and propylene, and in fact, it has been found that the cross-linking efficiency for such binary copolymers is quite low when using conventional cross-linking agents. Accordingly, the degree of cross-linking using conventional cross-linking agents is usually insufficient to provide a copolymer of sufficiently high mechanical strength.

It has been proposed to alleviate this problem by the use of terpolymers having a suitable cure-site unit. While these terpolymers have been shown to be highly cross-linkable with good efficiency, and will yield a fluorine-containing elastomer of high mechanical strength, the presence of these cure-site units in the copolymer causes an undesirable decrease in the heat resistance characteristic of the copolymer and hence has not been a satisfactory solution to that problem.

SUMMARY OF THE INVENTION

Accordingly, it is one object of this invention to provide an improved method for cross-linking copolymers of tetrafluoroethylene and propylene.

It is another object of this invention to provide an improved method for cross-linking copolymers of tetrafluoroethylene and propylene in a high cross-linking efficiency.

It is still another object of this invention to provide a method for producing a cross-linked copolymer of tetrafluoroethylene-propylene having high mechanical strength.

A further object of this invention is to provide a method for cross-linking a binary copolymer of tetrafluoroethylene and propylene to impart satisfactory mechanical strength.

These and other objects, as will hereinafter become more readily apparent, can be attained by heating a copolymer of tetrafluoroethylene-propylene in the presence of an organic di-peroxy compound, and, if necessary, a cross-linking promoter, a reinforcing filler, etc.

DETAILED DESCRIPTION OF THE PREFERRED EMBODIMENTS

The copolymers of tetrafluoroethylene-propylene used in this invention can be prepared by conventional bulk polymerization, solution polymerization, suspension polymerization, emulsion polymerization, or the like. Polymerization can be effected by the use of any conventional catalyst system and/or polymerization initiator, or can be initiated by thermopolymerization, photopolymerization, high energy ionizing radiationpolymerization techniques, or the like.

These copolymers may also be copolymerized with minor amounts of other copolymerizable components, such as ethylene, isobutylene, acrylic acid, vinyl fluoride, vinylidene fluoride, hexafluoropropylene, chlorotrifluoroethylene, chloroethylvinylether, or perfluoroalkylvinylether.

The molar ratio of tetrafluoroethylene to propylene in the copolymer can be selected over broad ranges, such as a molar ratio of tetrafluoroethylene/propylene of 90/10–20/80, and preferably 70/30–30/70, and especially 60/40–40/60.

The molecular weight of the copolymer used and the particular molar ratio of the components can be selected according to the desired end properties and the particular applications intended for the end product, although it is most desirable to use binary copolymers of tetrafluoroethylene and propylene having molecular weights of greater than 20,000 and intrinsic viscosities in tetrahydrofuran at 30° C. of greater than 0.25.

The molecular weight of the copolymer of the starting material is an important factor in obtaining high mechanical strength, e.g., high tensile strength. Best results are attainable when the molecular weight is 40,000–120,000, and particularly 50,000–100,000.

By the methods of this invention, cross-linked copolymers of tetrafluoroethylene-propylene having tensile strengths of higher than 100 kg./cm.$^2$, and particularly higher than 150 kg./cm.$^2$ can be prepared, even though a binary copolymer of tetrafluoroethylene-propylene is used. This is quite unique as compared with the tensile strengths attainable with conventional organic peroxy compounds, wherein it is extremely difficult to attain tensile strengths of more than 60 kg./cm.$^2$, even if a reinforcing filler, such as rubber is added, as is clear from the disclosure of U.S. Pat. No. 3,467,635.

The organic diperoxy compound used as the cross-linking agent, or curing agent, in the method of this invention, is preferably a compound having the formula:

where $R_1$ and $R_3$ represent, respectively, an alkyl group having 1–10 carbon atoms; a benzoyl group, a cumyl group,

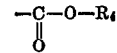

wherein $R_4$ is an alkyl group having 1–10 carbon atoms, or

wherein $R_4$ is an alkyl group having 1–10 carbon atoms; $R_2$ represents a saturated, unsaturated, straight chain or branched chain type alkylene group such as:

$$-C(CH_3)_2-C\equiv C-C(CH_3)_2-, \quad -C(CH_3)_2-CH_2CH_2-C(CH_3)_2-,$$

$$-\underset{\underset{C_2H_5}{|}}{\overset{\overset{CH_3}{|}}{C}}-,\quad -\underset{\underset{O}{\|}}{C}-,\quad -\underset{\underset{O}{\|}}{C}-(CH_2)_n-\underset{\underset{O}{\|}}{C}-,\quad -\underset{\underset{O}{\|}}{C}NH-(CH_2)_m-NH\underset{\underset{O}{\|}}{C}-,$$

wherein $m$ and $n$ are the integers 1–12; or $$-\underset{\underset{O}{\|}}{C}-\left\langle\phantom{xx}\right\rangle-\underset{\underset{O}{\|}}{C}-$$

or $\quad -C(CH_3)_2-\left\langle\phantom{xx}\right\rangle-C(CH_3)_2-$

Suitable such compounds include:

2,5-dimethyl-2,5-di(t-butyl peroxy)-hexine-3

$$(CH_3-\underset{\underset{CH_3}{|}}{\overset{\overset{CH_3}{|}}{C}}-O-O-\underset{\underset{CH_3}{|}}{\overset{\overset{CH_3}{|}}{C}}-C\equiv C-\underset{\underset{CH_3}{|}}{\overset{\overset{CH_3}{|}}{C}}-O-O-\underset{\underset{CH_3}{|}}{\overset{\overset{CH_3}{|}}{C}}-CH_3),$$

2,5-dimethyl-2,5-di(t-butyl peroxy) hexane $$(CH_3-\underset{\underset{CH_3}{|}}{\overset{\overset{CH_3}{|}}{C}}-O-O-\underset{\underset{CH_3}{|}}{\overset{\overset{CH_3}{|}}{C}}-CH_2-CH_2-\underset{\underset{CH_3}{|}}{\overset{\overset{CH_3}{|}}{C}}-O-O-\underset{\underset{CH_3}{|}}{\overset{\overset{CH_3}{|}}{C}}-CH_3),$$

α,α'-bis(t-butyl peroxy)-para-diisopropyl benzene $$(CH_3-\underset{\underset{CH_3}{|}}{\overset{\overset{CH_3}{|}}{C}}-O-O-\underset{\underset{CH_3}{|}}{\overset{\overset{CH_3}{|}}{C}}-\left\langle\phantom{xx}\right\rangle-\underset{\underset{CH_3}{|}}{\overset{\overset{CH_3}{|}}{C}}-O-O-\underset{\underset{CH_3}{|}}{\overset{\overset{CH_3}{|}}{C}}-CH_3),$$

2,5-di-(2-ethylhexanoyl peroxy)-2,5-dimethyl hexane $$(C_7H_{15}-\underset{\underset{O}{\|}}{C}-O-O-\underset{\underset{CH_3}{|}}{\overset{\overset{CH_3}{|}}{C}}-CH_2CH_2-\underset{\underset{CH_3}{|}}{\overset{\overset{CH_3}{|}}{C}}-O-O-\underset{\underset{O}{\|}}{C}-C_7H_{15})$$

2,5-dimethyl-2,5-di(benzoyl peroxy)hexane $$\left(\left\langle\phantom{xx}\right\rangle-\underset{\underset{O}{\|}}{C}-O-O-\underset{\underset{CH_3}{|}}{\overset{\overset{CH_3}{|}}{C}}-CH_2-CH_2-\underset{\underset{CH_3}{|}}{\overset{\overset{CH_3}{|}}{C}}-O-O-\underset{\underset{O}{\|}}{C}-\left\langle\phantom{xx}\right\rangle\right)$$

$$CH_3-\underset{\underset{CH_3}{|}}{\overset{\overset{CH_3}{|}}{C}}-O-O-\underset{\underset{O}{\|}}{C}-O-O-\underset{\underset{CH_3}{|}}{\overset{\overset{CH_3}{|}}{C}}-CH_3$$

$$CH_3-\underset{\underset{CH_3}{|}}{\overset{\overset{CH_3}{|}}{C}}-O-O-\underset{\underset{C_2H_5}{|}}{\overset{\overset{CH_3}{|}}{C}}-O-O-\underset{\underset{CH_3}{|}}{\overset{\overset{CH_3}{|}}{C}}-CH_3$$

$$CH_2-\underset{\underset{CH_3}{|}}{\overset{\overset{CH_3}{|}}{C}}-O-O-\underset{\underset{O}{\|}}{C}-(CH_2)_4-\underset{\underset{O}{\|}}{C}-O-O-\underset{\underset{CH_3}{|}}{\overset{\overset{CH_3}{|}}{C}}-CH_3$$

$$CH_3-\underset{\underset{CH_3}{|}}{\overset{\overset{CH_3}{|}}{C}}-O-O-\underset{\underset{O}{\|}}{C}-\left\langle\phantom{xx}\right\rangle-\underset{\underset{O}{\|}}{C}-O-O-\underset{\underset{CH_3}{|}}{\overset{\overset{CH_3}{|}}{C}}-CH_3$$

$$CH_3-\underset{\underset{CH_3}{|}}{\overset{\overset{CH_3}{|}}{C}}-O-O-\underset{\underset{O}{\|}}{C}-\left\langle\phantom{xx}\right\rangle-\underset{\underset{O}{\|}}{C}-O-O-\underset{\underset{CH_3}{|}}{\overset{\overset{CH_3}{|}}{C}}-CH_3$$

$$CH_3-\underset{\underset{CH_2}{|}}{\overset{\overset{CH_3}{|}}{C}}-O-O-\underset{\underset{CH_2}{|}}{\overset{\overset{CH_3}{|}}{C}}-O-O-\underset{\underset{CH_3}{|}}{\overset{\overset{CH_3}{|}}{C}}-CH_3$$

$$CH_2-COOC_4H_9$$

$$CH_3-\underset{\underset{CH_2}{|}}{\overset{\overset{CH_3}{|}}{C}}-O-O-\underset{\underset{O}{\|}}{C}-NH-(CH_2)_6-NH-\underset{\underset{O}{\|}}{C}-O-O-\underset{\underset{CO_3}{|}}{\overset{\overset{CH_3}{|}}{C}}-CH_3$$

or $$\left\langle\phantom{xx}\right\rangle-\underset{\underset{CH_3}{|}}{\overset{\overset{CH_3}{|}}{C}}-O-O-\underset{\underset{O}{\|}}{C}-NH-(CH_2)_6-NH-\underset{\underset{O}{\|}}{C}-O-O-\underset{\underset{CH_3}{|}}{\overset{\overset{CH_3}{|}}{C}}-\left\langle\phantom{xx}\right\rangle$$

The most preferred organic diperoxy compounds used herein are those compounds in which $R_1$ and $R_3$ are respectively alkyl group having 5–10 carbon atoms, benzoyl group or cumyl group, and especially t-butyl group, benzoyl group, cumyl group, from point of view of commercial availability.

It is desirable that the organic diperoxy compound selected have a 5-minute half-life temperature of 70–160° C., and especially 90–150° C. The 5-minute half-life temperature of some organic diperoxy compounds are as follows:

| | °C. |
|---|---|
| 2,5-dimethyl-2,5-di(t-butyl peroxy)-hexine-3 | 121 |
| 2,5-dimethyl-2,5-di(t-butyl peroxy)-hexane | 129 |
| α,α-bis(t-butyl peroxy)-p-diisopropylbenzene | 114 |
| 2,5-dimethyl-2,5-di(benzoyl peroxy)-hexane | 142 |
| 2,5-di-(2-ethylhexanoyl peroxy)-2,5-dimethyl hexane | 91 |
| $CH_3-\underset{\underset{CH_3}{|}}{\overset{\overset{CH_3}{|}}{C}}-O-O-\underset{\underset{O}{\|}}{C}-\left\langle\phantom{xx}\right\rangle-\underset{\underset{O}{\|}}{C}-O-O-\underset{\underset{CH_3}{|}}{\overset{\overset{CH_3}{|}}{C}}-CH_3$ | 129 |

The quantity of organic diperoxy compound necessary will be dependent upon the particular type and molecular weight of the copolymer used, and the mechanical strength and other characteristics of the resulting cross-linked copolymer desired, the type of organic diperoxy compound used, and, of course, the cross-linking conditions.

It is usual to use 0.1–20 parts by weight, preferably 1–10 parts by weight of the organic diperoxy compound to 100 parts by weight of the copolymer of tetrafluoroethylene-propylene. Although the organic diperoxy compound is used as a cross-linking agent, or curing agent, it usually will not remain in the cross-linked chain.

If desired, a cross-linking promoter may be used with the organic diperoxy compound. Suitable such promoters are sulfur, organic amine, divinyl compound, methacrylate, maleimides, and preferably the allyl containing organic compounds, e.g., di-allyl phthalate, tri-allyl phosphate, tri-allyl cyanurate, diallyl melamine, and oxime compounds, 3 g., parabenzoquinone oxime, p,p'-dibenzoyl benzoquinone dioxime.

Good results are attainable with the inclusion of 0.1–20 parts by weight of the promoter, and preferably 0.2–10 parts by weight to 100 parts of the copolymer of tetrafluoroethylene-propylene. Various conventional additives, as are used in the conventional cross-linking methods, may also be used. For instance, reinforcing fillers, such as carbon black, fine silica, antioxidants and stabilizers, may be used. Also, inorganic oxides may be used as accelerators for cross-linking, such as magnesium, oxide, lead oxide, zinc, calcium oxide. Although many of these additives have been used for other purposes, they have not been directly used heretofore for binary copolymers of tetrafluoroethylene-propylene.

In carrying out this reaction, it is preferable to admix the copolymer of tetrafluoroethylene-propylene, the cross-linking agent; if necessary, the promoter, and any other additives. These components may be mixed by use of a roller, such as is commonly used for kneading rubber, a Banbury's mixer, etc. The conditions of mixing are not specifically critical and the organic diperoxy compound or other additives can be completely dispersed into the copolymer by kneading of about 30–80° C. for about 10–60 minutes. The conditions of the mixing operation can be readily determined depending upon the specific materials and the end purposes of the product.

The mixture is then heated to effect cross-linking. The heating operation can be accomplished in a mold under pressure, by a molding opertion by extrusion or by injection molding and heating. The specific heating conditions will be determined by the particular materials, etc., but usually is about 80–250° C., preferably 150–200° C. The heating period for effecting adequate cross-linking is usually more than 20 mintes, and preferably 0.5–2 hours. In general, the higher the temperature, the shorter will be the required temperature heating period.

The mechanical strength of the resulting cross-linked copolymer can be further increased by re-heating or re-curing. For example, the tensile strength of the cross-linked copolymer can be effectively increased by re-heating the once cross-linked copolymer at 150–250° C. and preferably 180–230° C. for 15–25 hours.

The following Examples, in which parts and percents are by weight unless otherwise indicated, are intended merely to describe specific embodiments of the present invention and are not to be construed as a limitation on the scope of the invention.

EXAMPLES 1–4

A copolymer of tetrafluoroethylene-propylene having an average molecular weight of about 87,000 (molar ratio of $C_2F_4/C_3H_6$ in the copolymer is 52/48) was admixed and kneaded with the compounds shown in Table I, at 50–60° C., in a roller having a diameter of 3 inches, to effect uniform dispersion.

The resulting mixture was cross-linked by heating at 160° C. for 30 minutes under pressure of 50–60 kg./cm.² by use of a heated pressure mold. The resulting cross-linked copolymer was tested for ultimate tensile strength, and ultimate elongation and modulus in 100% elongation.

The results are shown in Table II.

The tensile test was carried out at a tensile velocity of 500 mm./minutes, at 25° C.

TABLE I

|  | Example— | | | |
|---|---|---|---|---|
|  | 1 | 2 | 3 | 4 |
| Copolymer | 100 | 100 | 100 | 100 |
| α,α'-Bis(t-butyl-peroxy p-diisopropyl benzene | 5 | | | |
| 2,5-dimethyl-2,5-di-(t-butyl peroxy) hexine-3 | | 4 | | |
| 2,5-dimethyl-2,5-di-(t-butyl peroxy) hexane | | | 4 | |
| 2,5-dimethyl-2,5-di (benzoyl peroxy) hexane | | | | 6 |
| Triallyl cyanurate | 3 | 3 | 3 | 3 |
| Magnesium oxide | 5 | 5 | 5 | 5 |
| FEF carbon | 25 | 25 | 25 | 25 |

TABLE II

|  | Example— | | | |
|---|---|---|---|---|
|  | 1 | 2 | 3 | 4 |
| Ultimate tensile strength (kg./cm.²) | 167 | 129 | 133 | 134 |
| Ultimate elongation (percent) | 298 | 317 | 361 | 305 |
| Modulus in 100% elongation (kg./cm.²) | 26 | 27 | 27 | 41 |

EXAMPLE 5

A copolymer of tetrafluoroethylene-propylene having an average molecular weight of 74,000 (molar ratio of $C_2F_4/C_3H_6$ in the copolymer is 50/50) was used to prepare the formula of Example 2. The temperature and period of the cross-linking operation are shown in Table III.

TABLE III

| Condition in cross-linking | 160° C., 60 min. | 180° C., 30 min. | 200° C., 15 min. |
|---|---|---|---|
| Ultimate tensile strength (kg./cm.²) | 115 | 124 | 102 |
| Ultimate elongation (percent) | 307 | 282 | 259 |
| Modulus in 100% elongation (kg./cm.²) | 44 | 51 | 49 |

EXAMPLES 6–8

The copolymer of Example 1 was used.
Conditions in cross-linking: 160° C., 60 minutes.
Additives were changed.
The formula is shown in Table IV.
The results are shown in Table V.

TABLE IV

|  | Example— | | |
|---|---|---|---|
|  | 6 | 7 | 8 |
| Copolymer | 100 | 100 | 100 |
| 2,5-dimethyl-2,5-di(t-butyl peroxy)hexine-3 | 4 | 4 | 4 |
| Magnesium oxide | 5 | 5 | 5 |
| FEF carbon | 25 | 25 | 25 |
| Triallyl phosphate | 3 | | |
| Diallyl melamine | | 2.5 | |
| p,p-Dibenzoyl benzoxime | | | 4 |

TABLE V

|  | Example— | | |
|---|---|---|---|
|  | 6 | 7 | 8 |
| Ultimate tensile strength (kg./cm.²) | 158 | 172 | 114 |
| Ultimate elongation (percent) | 375 | 326 | 458 |
| Modulus in 100% elongation (kg./cm.²) | 28 | 30 | 37 |

EXAMPLES 9–10

In these Examples, the cross-linked copolymer is reacted after the first cross-linking procedure. The cross-linked copolymers of Examples 1 and 8 were further heated at 160° C. for 20 hours in an electric furnace.

The results are shown in Table VI.

TABLE VI

|  | Example— | |
|---|---|---|
|  | 9 | 10 |
| Ultimate tensile strength (kg./cm.²) | 188 | 180 |
| Ultimate elongation (percent) | 239 | 280 |
| Modulus in 100% elongation (kg./cm.²) | 48 | 82 |

EXAMPLES 11–13

In these Examples, various inorganic additives were used. Conditions in cross-linking: to heat at 160° C. for 60 minutes press-cross-linking and further to heat at 160° C. for 20 minutes in an electric furnace. Molecular weight of the copolymer of starting material was 87,000.

The formulas are shown in Table VII.

The results are shown in Table VIII.

TABLE VII

|  | Example— | | |
|---|---|---|---|
|  | 11 | 12 | 13 |
| Copolymer | 100 | 100 | 100 |
| 2,5-dimethyl-2,5-di(t-butyl peroxy)hexine-3 | 4 | 4 | 4 |
| Triallyl cyanurate | 3 | 3 | 3 |
| FEF carbon | 25 | 25 | 25 |
| Lead oxide | 27 | | |
| Zinc oxide | | 10 | |
| Calcium hydroxide | | | 9 |

TABLE VIII

|  | Example— | | |
|---|---|---|---|
|  | 11 | 12 | 13 |
| Ultimate tensile strength (kg./cm.²) | 197 | 170 | 159 |
| Ultimate elongation (percent) | 260 | 248 | 203 |
| Modulus in 100% elongation (kg./cm.²) | 51 | 48 | 48 |

EXAMPLE 14

A copolymer of tetrafluoroethylene-propylene having an average molecular weight of 56,000 (molar ratio of $C_2F_4/C_3H_6=51/49$) was admixed according to the following formula:

| | |
|---|---|
| Copolymer | 100 |
| 2,5-dimethyl-2,5-di-(t-butyl peroxy) hexine-3 | 4 |
| Triallyl cyanurate | 3 |
| Magnesium oxide | 5 |
| FEF carbon | 25 |

The mixture of said materials was cross-linked at 160° C. for 60 minutes by pressing, and then was further cross-linked at 160° C. for 20 hours in an electric furnace.

The resulting cross-linked copolymer had the following properties:

Ultimate tensile strength (kg./cm.$^2$) _____ 109
Ultimate elongation (percent) _____ 404
Modulus in 100% elongation (kg./cm.$^2$) _____ 44

EXAMPLE 15

A copolymer of tetrafluoroethylene-propylene having an average molecular weight of 97,000 (molar ratio of $C_2F_4/C_3H_6=52/48$) was admixed according to the following formula:

Copolymer _____ 100
α,α'-Bis-(t-butyl peroxy)-P-diisopropylbenzene ____ 5
P,P'-dibenzoyl benzoquinone dioxime _____ 3
Magnesium oxide _____ 5
FEF carbon _____ 25

The mixture of said materials was cross-linked at 170° C. for 40 minutes by pressing, and then was further cross-linked at 200° C. for 24 hours in an electric furnace.

The resulting cross-linked copolymer had the following properties:

Ultimate tensile strength (kg./cm.$^2$) _____ 233
Ultimate elongation (percent) _____ 246
Modulus in 100% elongation (kg./cm.$^2$) _____ 71

EXAMPLES 16–17

A copolymer of tetrafluoroethylene-propylene having an average molecular weight of 74,000 (molar ratio of $C_2F_4/C_3H_6=52/48$) was admixed according to the following formula:

|  | Example— | |
|---|---|---|
|  | 16 | 17 |
| Copolymer | 100 | 100 |
| 2,5-Di-(2-ethylhexanoylperoxy) 2,5-dimethyl hexane | 6.2 | |
| Di-t-butyl diperoxy phthalate | | 4.5 |
| Triallyl cyanurate | 3 | 3 |
| Magnesium oxide | 5 | 5 |
| FEF carbon | 25 | 25 |

The mixture of said materials was cross-linked at 160° C. for 60 minutes by pressing, and then was further cross-linked at 160° C. for 20 hours in an electric furnace. The resulting cross-linked copolymer had the following properties:

|  | Example— | |
|---|---|---|
|  | 16 | 17 |
| Ultimate tensile strength (kg./cm.$^2$) | 137 | 111 |
| Ultimate elongation | 275 | 182 |
| Modulus in 100% elongation (kg./cm.$^2$) | 67 | 65 |

EXAMPLES 18, 19, 20

A copolymer of tetrafluoroethylene-propylene having an average molecular weight of 74,000 (molar ratio of $C_2F_4/C_3H_6=52/48$) was admixed according to the following formula:

|  | Example— | | |
|---|---|---|---|
|  | 18 | 19 | 20 |
| Copolymer | 100 | 100 | 100 |
| α,α-Bis(t-butylperoxy)-p-di-isopropyl benzene | 4 | 5 | 6 |
| Triallyl cyanurate | 3 | 3 | 3 |
| Magnesium oxide | 10 | 10 | 10 |
| FEF carbon | 25 | 25 | 25 |

The mixture of said materials was cross-linked at 170° C. for 40 minutes by pressing, and then was further cross-linked at 200° C. for 24 hours in an electric furnace. The resulting cross-linked copolymer had the following properties:

|  | Example— | | |
|---|---|---|---|
|  | 18 | 19 | 20 |
| Ultimate tensile strength (kg./cm.$^2$) | 160 | 170 | 174 |
| Ultimate elongation (percent) | 203 | 155 | 132 |
| Modulus in 100% elongation (kg./cm.$^2$) | 39 | 44 | 48 |
| Hardness (Shore A) | 78 | 82 | 85 |

Having now fully described the invention, it will be apparent to one of ordinary skill in the art that many changes and modifications can be made thereto without departing from the spirit or scope of the invention.

Accordingly, what is claimed as new and intended to be covered by Letters Patent is:

1. A method for cross-linking copolymers of tetrafluoroethylene and propylene which comprises heating the copolymers of tetrafluoroethylene and propylene in the presence of an organic di-peroxy compound of the form $$R_1\text{—}O\text{—}O\text{—}R_2\text{—}O\text{—}O\text{—}R_3$$

wherein $R_1$ and $R_3$ represent, respectively, an alkyl group having 1–10 carbon atoms; a benzoyl group, a cumyl group,

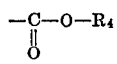

wherein $R_4$ is an alkyl group having 1–10 carbon atoms, or

wherein $R_4$ is an alkyl group having 1–10 carbon atoms; $R_2$ represents a saturated, unsaturated, straight chain or branched chain type alkylene groups,

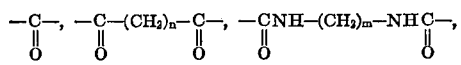

wherein $m$ and $n$ are the integers 1–12,

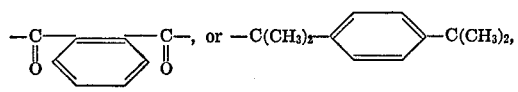

in which the heating temperature is in the range of from 80° to 250° C. and in which the organic di-peroxy compound is present in an amount of from 0.1 to 20 parts by weight per 100 parts by weight of the copolymer of tetrafluoroethylene and propylene, and in which the molar ratio of tetrafluoroethylene/propylene is in the range of from 90/10 to 20/80.

2. The method according to Claim 1, in which the heating temperature is in the range of from 150° to 250° C.

3. The method according to Claim 1, in which the heating period is in the range of 0.5–2 hours.

4. The method according to Claim 1, in which the organic di-peroxy compound is present in an amount of from 1 to 10 parts by weight per 100 parts by weight of the copolymer of tetrafluoroethylene and propylene.

5. The method according to Claim 1, in which the organic di-peroxy compound had a 5-minute half life temperature of 90°–150° C.

6. The method according to Claim 1, in which the molecular weight of the copolymer of tetrafluoroethylene and propylene is in the range of from 40,000 to 120,000.

7. The method according to Claim 1, in which the molar ratio of tetrafluoroethylene/propylene is in the range of from 70/30 to 30/70.

8. The method according to Claim 1, wherein said cross-linking is effected in the presence of an organic di-peroxy compound as curing agent and a cross-linking promoter.

9. The method acording to Claim 8, wherein the promoter is an allyl-containing organic compound.

10. The method according to Claim 8, in which the promoter is present in an amount of from 0.1 to 20 parts by weight per 100 parts by weight of the copolymer of tetrafluoroethylene and propylene.

11. The method according to Claim 8, wherein the promoter is an organic oxime compound.

12. A method of Claim 1 for curing copolymers of tetrafluoroethylene and propylene which comprises mixing the copolymers of tetrafluoroethylene and propylene with an organic di-peroxy compound as a curing agent, heating the mixture at a temperature of between 80° C. and 250° C. for 0.5 to 2 hours, and re-heating the resultant cross-linked copolymer at a temperature of between 150° C. and 250° C. for 15 to 25 hours.

References Cited

UNITED STATES PATENTS

| | | | |
|---|---|---|---|
| 2,965,619 | 12/1960 | Honn et al. | 260—79.5 |
| 2,999,854 | 9/1961 | Honn et al. | 260—79.5 |
| 3,467,635 | 9/1969 | Brasen et al. | 260—80.76 |

STANFORD M. LEVIN, Primary Examiner

U.S. Cl. X.R.

260—41 C, 80.76, 80.77, 80.78, 80.8